United States Patent [19]

Roberts

[11] 4,317,088
[45] Feb. 23, 1982

[54] CAPILLARY WAVEGUIDE LASER WITH COOLED POROUS WALLS

[75] Inventor: Thomas G. Roberts, Huntsville, Ala.

[73] Assignee: The United States of America as represented by the Secretary of the Army, Washington, D.C.

[21] Appl. No.: 138,055

[22] Filed: Apr. 7, 1980

[51] Int. Cl.³ .............................................. H01S 3/19
[52] U.S. Cl. ...................................... 372/92; 428/36; 372/55
[58] Field of Search .................... 331/94.5 G, 94.5 D; 428/36

[56] References Cited

U.S. PATENT DOCUMENTS 4,091,133  5/1978  Papayoanou .............. 331/94.5 D X

OTHER PUBLICATIONS

Papayoanou et al., "Porous-Wall BeO Capillary Waveguide Laser", Applied Physics Letters, vol. 26, No. 4, Feb. 15, 1975, pp. 158-160.
Papayoanou et al., "Theory of Porous Wall Capillary Tubes for Flowing Gas Lasers", IEEE Journal of Quantum Electronics, vol. QE-11, No. 8, Aug. 1975, pp. 579-583.

Primary Examiner—James W. Davie
Attorney, Agent, or Firm—Nathan Edelberg; Robert P. Gibson; Robert C. Sims

[57] ABSTRACT

The porous wall of the capillary tube for a flowing gas laser is surrounded by a further porous copper tube. A dense copper wall surrounding the copper tube and being connected to it periodically along its length by partially open copper washers.

5 Claims, 2 Drawing Figures

CAPILLARY WAVEGUIDE LASER WITH COOLED POROUS WALLS

DEDICATORY CLAUSE

The invention described herein may be manufactured, used, and licensed by or for the Government for governmental purposes without the payment to me of any royalties thereon.

BACKGROUND OF THE INVENTION

Small-bore capillary lasers exhibit very high optical gains and saturation intensities in flowing gas $CO_2$ systems. However, as a result of the linear axial pressure variation in the capillary tubes, these parameters may vary greatly in the axial direction. The gain per unit length decreases strongly as the tube length is increased. Thus establishing a limit in scaling such tubes to longer lengths. The reason for this decreased gain per unit length as the tube length is increased is due to the nonuniform axial pressure distribution occurring in longitudinal flow. In these waveguide capillary lasers a Hagen-Poiseville flow is established and is sustained by a pressure gradient in the direction of flow. The pressure decreases linearly along the tube axis from some high input pressure $P_1$ to some lower exit pressure $P_o$. The equation for such flow is given by $$F = \frac{\pi a^4}{4n} \cdot \frac{P_1 + P_o}{2kT} \cdot \frac{P_1 - P_o}{l}$$

where F is the flux or number of gas molecules flowing per unit time through the capillary of length l, n is the gas viscosity, a is the bore radius, k is the Boltzmann constant, and T is the absolute gas temperature. Thus, the gas flow in the tube depends on the tube dimensions a and l as well as the pressure differential and the temperature. For narrow bore tubes, fast flow or long capillaries the axial pressure differential can become large thereby limiting the optimum pressure, for gain, to a relatively short length of the tube axis. For example, in the case of a $CO_2$ mixture, pressure ratios $P_1/P_0$ of about 5 are required to attain optimum flow rates in 1-mm bore tubes of only 10 cm lengths.

It has been found that this pressure anisotropy can be considerably reduced by using a porous-wall BeO capillary tube which allows the gas mixture to be introduced into the discharge volume with greater axial uniformity. See "Porous-Wall BeO Capillary Waveguide Laser" by A. Papayoanou and A. Fujisawa; Appl. Phys. Lett. 26, p. 158, 15 Feb. 1975, and "Theory of Porous Wall Capillary Tubes for Flowing Gas Lasers" by A. Papayoanou and A. Fujisawa, IEEE J. Quant. Elect., QE-11, p. 579, August 1975. The gas enters the control bore through the pores from a high pressure chamber surrounding the tube. If the pumps are used to pull the gas out both ends of the tube then the highest pressure, $P_1$, occurs in the center of the tube and the lowest pressure, $P_0$, occurs at both ends of the tube. The pressure differential is reduced by a factor of four in this manner. Half of this is a result of introducing the gas mixture in a distributed manner through the porous walls. However, the thermal conductivity of even dense BeO tube is low and the thermal conductivity of the porous BeO tubes is 5–6 times lower. Therefore it is necessary to strongly cool the tube along its entire length in order to realize the advantages of the reduced pressure anisotropy. This may be accomplished by using cooling rods or a cooling block contoured to the tube's outer radius; but thermal rods or the block, in order to be effective, covers about half or more of the tubes surface which causes the gas mixture to be introduced nonuniformly radially.

DESCRIPTION OF THE BEST MODE AND PREFERRED EMBODIMENT

The invention disclosed here allows the porous BeO to be made much thinner and to be cooled over the entire surface without impeding the flow of the gas mixture. This eliminates the development of inhomogeneities due to temperature induced pressure gradients and increases the ability of these lasers to be scaled to high pressures, longer lengths or higher flow rates.

Figure 1:
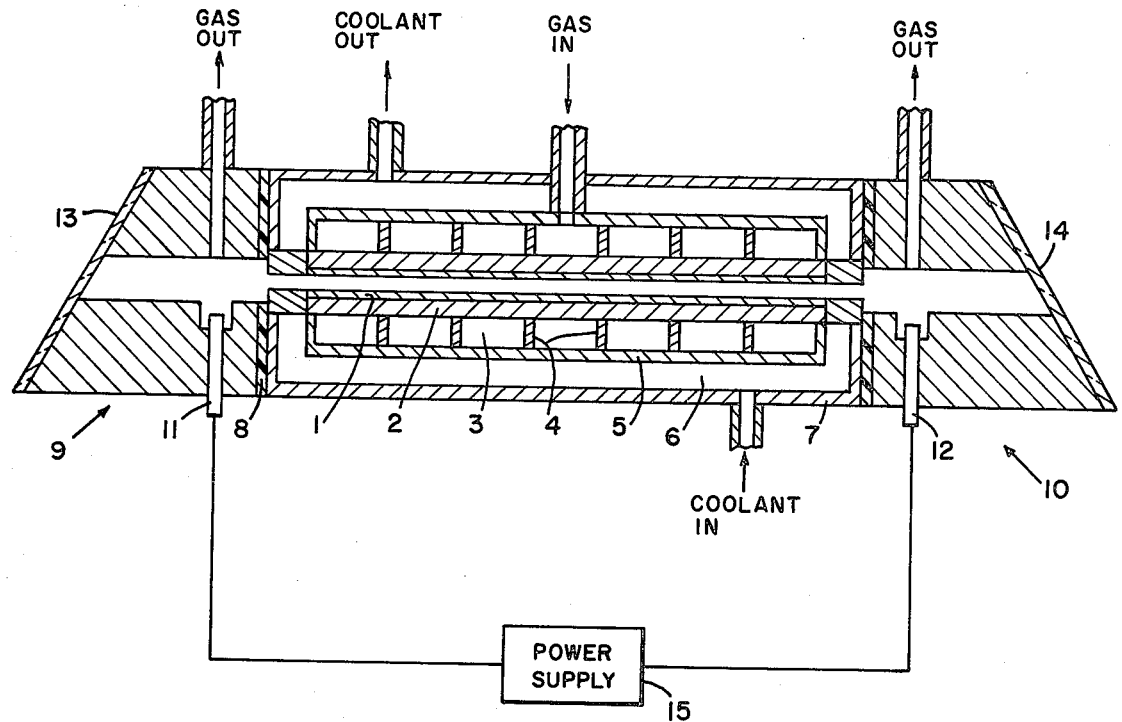
FIG. 1 is a partically cut-away diagrammatic view of the present invention.
Figure 2:
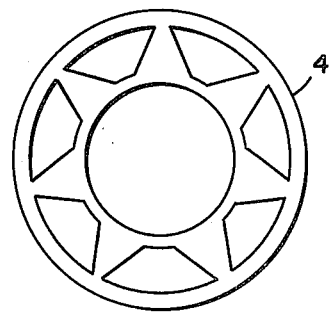
FIG. 2 is a detail showing of the copper washer.

This is accomplished as illustrated in FIG. 1. Where the thin porous BeO tube 1 is inclosed in a porous copper tube 2. The method of constructing the porous copper tube is explained below. These two tubes are fitted inside a dense copper cylinder 5 to form the high pressure gas inlet chamber 3. The porous copper wall of this chamber is also connected to outer dense copper wall periodically along the length by partially open copper washers 4. These washers appear as shown in FIG. 2, where it may be seen that they have been cut so as to maximize the thermal conductivity between the walls and still allow the gas mixture to have a uniform pressure in the high pressure chamber 3. The washers may be solid porous washers also. The dense copper wall of the high pressure chamber 5 forms the interwall of the coolant chamber 6. The outer wall of the coolant chamber 7 may also be made of copper. This structure is now joined to the conventional ends 9 and 10 of a laser tube which contains the electrodes 11 and 12 and the Brewster's window 13 and 14. As shown in FIG. 1 the laser is operational as an amplifier, but if mirrors are placed outside the windows (not shown) it may be operated as an oscillator. A power supply 15 is provided for the electrodes. The ends of the two porous tubes are joined to two disks of dense BeO and these disks are afixed to the conventional laser ends. For the pressures used in these waveguide lasers viscous flow occurs in which the particle mean free path is much less than the pore dimensions in the porous BeO and porous copper. Thus, the transport rates of the gaseous components are equalized as a result of collisions between unlike particles and the gas mixture flows a fluid without separating.

The porous BeO tubes have a density of about 70% that of dense BeO tubes, and they can be manufactured more cheaply than dense wall tubes. The pore size generally varies between 2 and 10 $\mu$m which allows easy pumping of the gas mixture through the walls.

One method of preparation of the porous copper tube consists of etching the zinc out of an alloy of copper and zinc (brass). These brass tubes which may be as thin as 5/1000" (or they may be thicker) are etched in a boiling solution (104.6° C.) of one part of volume of C. P. Reagent hydrochloric acid and three parts by volume of distilled water. Termination of the etching process is indicated by the cessation of hydrogen formation on the surface of the metal tube. This process takes about 100 hours. The tubes which are now porous copper are boiled in distilled water for approximately two hours before being warm air dried at a temperature of 200° C. Silver tubes may also be made from a specially prepared alloy of 60 percent silver and 40 percent zinc if a slightly higher thermal conductivity is desired. For the silver tubes the etching takes place in less time (see U.S. Pat. No. 3,464,223, by T. G. Roberts and T. A. Barr).

Note: The main advantages here are the large thermal conductivity of copper and silver, the increased heat conduction by making the BeO tubes thin walled, and the fairly uniform temperature obtained for the entire length of the tube.

I claim:

1. In a laser having a porous wall capillary tube for flowing gas from outside the circumference of the tube into the tube and out its ends; the improvement comprising a second porous tube enclosing said capillary tube; said second tube having a greater thermal conductivity than said capillary tube; and cooling means attached to said second tube.

2. A laser set forth in claim 1 wherein a high pressure gas chamber surrounds said second tube and said capillary tube so as to cause gas flow through said tubes; said high pressure chamber having a wall of high thermal conductivity; and a plurality of washer means connecting said second tube and said high pressure wall for thermal flow.

3. A laser as set forth in claim 2 wherein said washer means are so constructed as to allow passage of gas therethrough.

4. A laser set forth in claim 3 wherein said device is a capillary waveguide laser with cooled porous walls.

5. A laser set forth in claim 2 or 4 wherein said second tube and said washers are made of copper; and said washers allow flow of gas throughout the whole length of said capillary tube.

* * * * *